United States Patent [19]
Heinzen

[11] Patent Number: 5,540,448
[45] Date of Patent: *Jul. 30, 1996

[54] SEAL WITH ELECTRICAL CONDUCTOR WEAR INDICATOR

[76] Inventor: Ralph Heinzen, P.O. Box 728, Garrison, N. Dak. 58540

[*] Notice: The term of this patent shall not extend beyond the expiration date of Pat. No. 5,246,235.

[21] Appl. No.: 114,507

[22] Filed: Aug. 31, 1993

Related U.S. Application Data

[63] Continuation-in-part of Ser. No. 841,388, Feb. 25, 1992, Pat. No. 5,246,235.

[51] Int. Cl.$^6$ .................................................... F16J 15/16
[52] U.S. Cl. ............................ 277/2; 277/901; 116/208
[58] Field of Search ...................... 277/2, 901; 116/208; 384/448

[56] References Cited

U.S. PATENT DOCUMENTS

| | | | |
|---|---|---|---|
| 1,706,181 | 3/1929 | Nelson | 384/477 |
| 3,113,813 | 12/1963 | Lobeck | 384/481 |
| 3,321,045 | 5/1967 | Veilleux | 116/208 X |
| 3,556,258 | 1/1971 | Winge et al. | 116/208 X |
| 3,572,858 | 3/1971 | Pompei | 384/477 |
| 3,716,113 | 2/1973 | Kobayashi et al. | 116/208 X |
| 4,184,145 | 1/1980 | Fima | 116/208 X |
| 4,320,431 | 3/1982 | Bell | 116/208 X |
| 4,497,493 | 2/1985 | Sall et al. | 277/2 |
| 4,832,160 | 5/1989 | Fargier et al. | 116/208 X |
| 4,833,440 | 5/1989 | Wojtanek | 338/114 |
| 4,915,510 | 4/1990 | Arvidsson | 384/448 X |
| 4,936,197 | 6/1990 | Brent | 277/103 X |
| 4,982,767 | 1/1991 | Pezzoli et al. | 116/208 X |
| 5,004,090 | 4/1991 | Kuribara et al. | 384/477 X |
| 5,111,178 | 5/1992 | Bosze | 338/160 |
| 5,246,235 | 9/1993 | Heinzen | 277/2 |

FOREIGN PATENT DOCUMENTS

| | | | |
|---|---|---|---|
| 0291104 | 11/1988 | European Pat. Off. | 384/477 |
| 2574508 | 6/1986 | France | 116/208 |
| 3444175 | 3/1986 | Germany | 277/2 |
| 0031263 | 3/1977 | Japan | 277/2 |
| 0005159 | 1/1979 | Japan | 277/2 |
| 0117852 | 9/1979 | Japan | 277/2 |
| 0204374 | 12/1982 | Japan | 277/2 |
| 0573648 | 9/1977 | U.S.S.R. | 277/2 |
| 0976172 | 11/1982 | U.S.S.R. | 277/2 |
| 2172945 | 10/1986 | U.S.S.R. | 116/208 |
| 1307115 | 4/1987 | U.S.S.R. | 384/448 |

Primary Examiner—William A. Cuchlinski, Jr.
Assistant Examiner—John L. Beres
Attorney, Agent, or Firm—Friederichs Law Firm

[57] ABSTRACT

A seal prevents leakage of fluid between the seal and a moving surface. The seal includes a seal body and a conductor. The seal body can undergo wear to a specified depth before the seal requires replacement. The conductor is placed about the moving surface such that wear of the seal body to a specified depth brings the conductor into contact with the moving surface. The conductor may be embedded in the seal body or otherwise attached to position the conductor about the moving surface. Wear of the seal body to a specified depth can be checked by checking electrical continuity of the conductor. The existence of electrical continuity between the conductor and the moving surface may indicate that the seal requires replacement. Alternatively, the conductor may be positioned such that the conductor has worn entirely through when the seal body has worn to a specified depth, with a loss of electrical continuity through the conductor indicating that the seal requires replacement.

21 Claims, 5 Drawing Sheets

SEAL WITH ELECTRICAL CONDUCTOR WEAR INDICATOR

This application is a continuation-in-part of application Ser. No. 07/841,388, filed Feb. 25, 1992, now U.S. Pat. No. 5,246,235, entitled "SEAL WITH EMBEDDED WIRE".

BACKGROUND OF THE INVENTION

The present invention relates to seals which are positioned against a moving surface, and more particularly to seals which prevent lubricant leakage from a bearing. The seal includes a conductor for indicating that the body of the seal has undergone excessive wear. The conductor is embedded within or attached to the body of the seal at a specified depth, namely the depth of acceptable wear. The electrical continuity of the conductor can be checked to determine if the seal body has worn to the specified depth.

Machinery often includes members which move with respect to each other. Bearings have long been used to facilitate such movement. Bearings are used to aid in transmitting forces from one member to another and to reduce friction. Rolling elements are often used in bearings to reduce friction, such as in ball bearings. Bearings often contain lubricant to reduce the friction created within the bearing.

Leakage of lubricant from bearings has long been a problem. Contamination of the bearings with foreign material such as dirt has also long been a problem. Both loss of lubricant and contamination lead to increased friction and wear within the bearing, damaging the bearing and perhaps damaging the machinery.

Seals composed of a soft polymeric material are used with bearings to prevent lubricant leakage and contamination. The polymeric material contacts a moving surface in the bearing and provides a seal. Friction between the polymeric material and the moving surface gradually wears the surface of the polymeric material away. If the polymeric material becomes too worn, it will no longer form a tight seal against the moving surface, and lubricant leakage from the bearing and contamination of the bearing again become problems.

Various methods have been developed to prevent or detect leakage past a seal. As shown in U.S. Pat. No. 4,761,023, one method involves monitoring the pressure of the fluid on the high pressure side of the seal, with a loss of pressure indicating leakage past the seal. Alternatively, as shown in U.S. Pat. No. 4,290,611, the fluid pressure on the low pressure side of the seal may be monitored, with an increase in pressure indicating lubricant leakage. A third method, such as that shown in U.S. Pat. No. 4,178,133, uses colored fluid and visual monitoring of leakage past a seal. Still other methods involve manual maintenance procedures, wherein seals are inspected or replaced on a regular basis.

These various methods to prevent or detect leakage past a seal have not proven satisfactory due to a number of problems. A problem with monitoring lubricant pressure is that it is only effective to detect leakage of the lubricant. Often this is too late to prevent damage. It is desired that the seal be replaced before leakage has begun. Similarly, visual monitoring of lubricant leakage can only indicate that leakage has begun, not that leakage is about to begin. A problem with manual inspection of a seal is that it requires an inspector who is not only trained but also diligent. Often seals are not inspected merely due to neglect or lack of diligence. Another problem with manual inspection is that it may require the machinery to be stopped during the inspection, which can be inconvenient. Scheduled seal replacement also has problems. Seals may wear more or less quickly depending on operating conditions, and scheduled seal replacement may occur too early (before the seal needs to be replaced) or too late (after the seal starts leaking).

SUMMARY OF THE INVENTION

The present invention provides a seal for recognizing excessive seal wear before lubricant leakage occurs. The seal is placed against a moving surface and forms a seal with the moving surface to prevent lubricant leakage. The seal includes a seal body and an electrical conductor. The seal body is composed of a substance which allows it to make a seal with the adjacent moving surface. Friction between the moving surface and the seal body causes gradual wear of the seal body.

The electrical conductor may be embedded in the seal body, attached to the seal body or otherwise positioned so that wear of the seal body will gradually change the location of the conductor with respect to the adjacent moving surface. Wear of the seal body to a specified depth can be detected by electrical continuity of the conductor. The conductor may contact the adjacent surface when wear of the seal body reaches a specified depth, with electrical continuity between the conductor and the adjacent surface indicating that the seal requires replacement. Alternatively, the conductor may be positioned such that it is worn entirely through when the wear of the seal body reaches a specified depth, with loss of electrical continuity through the conductor indicating that the seal requires replacement.

The present invention provides a simple, cost effective device and method to detect wear of a seal, avoiding the problems of previous devices. Because the device detects wear of the seal body rather than lubricant leakage, the seal can be replaced prior to leakage. The problems associated with waiting until after leakage has begun before replacing the seal are avoided. The seal can be replaced in a timely manner before leakage begins. Because the present invention is based on electrical continuity, an electrical signal circuit can easily be incorporated with the invention. The signal circuit can indicate to an operator when a seal needs to be replaced, and there is no problem with diligence on the part of an inspector. Because wear of the seal body can be determined without manual inspection, problems with training inspectors and with missed or failed inspections are avoided. There is also no need to stop the machinery just to check if the seal needs to be replaced. Because the present invention monitors the actual amount of wear on the seal body, there is no problem with early or late replacement of the seal based on a scheduled replacement program. Replacement of the seal of the present invention is based on the actual life of the seal body in operation, not on an average seal body life. Seals can be replaced less often and cost is reduced.

DETAILED DESCRIPTION OF THE PREFERRED EMBODIMENTS

Figure 1:
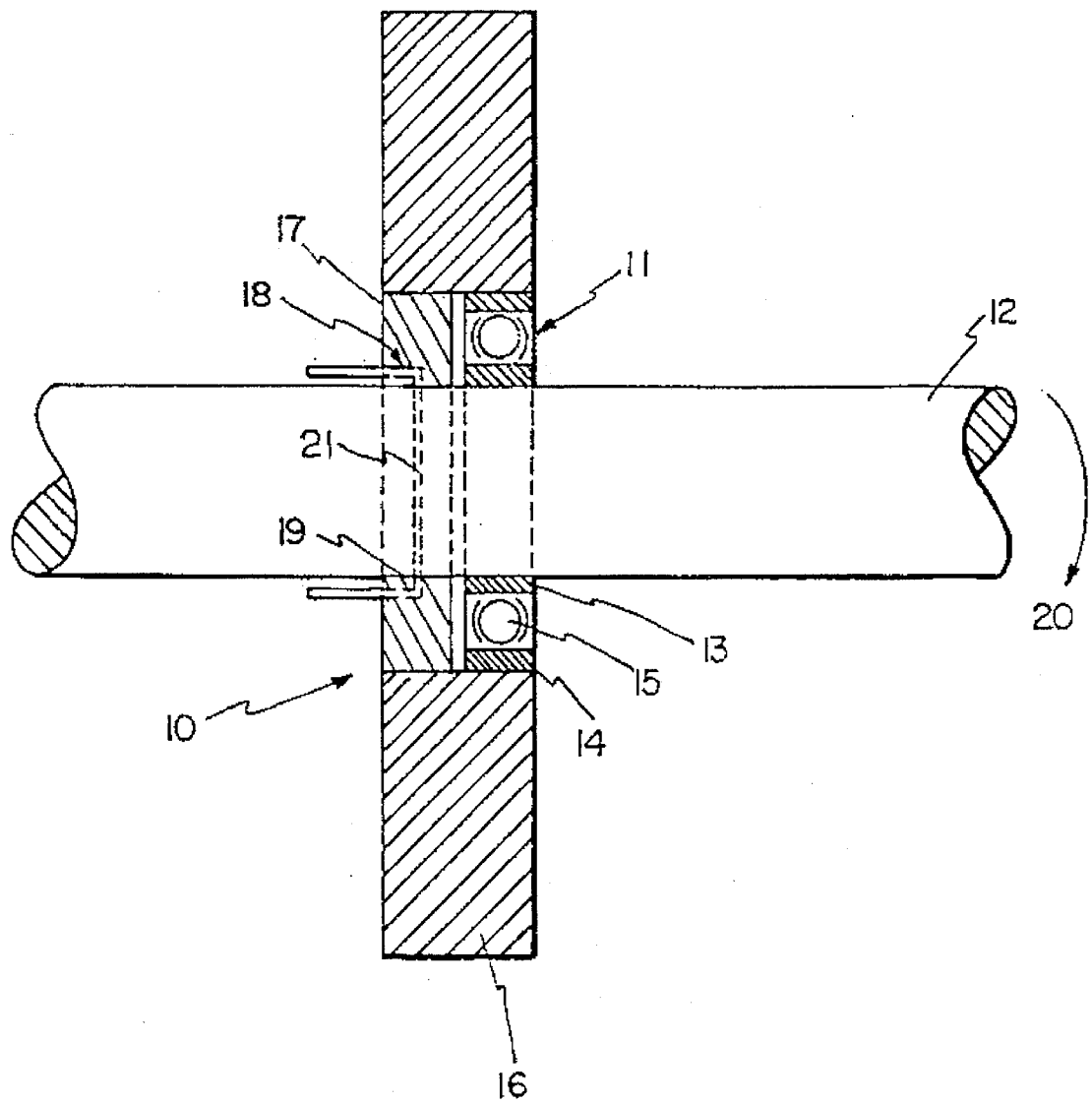
FIG. 1 shows a cross-sectional side view of the seal in place, adjacent a bearing and around a shaft.

FIG. 1 shows the seal 10 of the present invention in place, against a bearing 11 and around a shaft 12. The shaft 12 may rotate as indicated by arrow 20. The bearing 11 may have an inside race 13, an outside race 14, and a plurality of rolling elements, e.g. balls 15. The inside race 13 may be connected to the shaft 12 and may rotate with the shaft 12. The outside race 14 and the seal 10 may be connected to a housing 16 and may remain stationary. The rolling elements 15 may be spherical balls, as shown, or other cylindrical or needle rolling elements.

The seal 10 of the present invention includes a seal body 17 and an embedded conductor 18. As shown in FIG. 1, the seal body 17 may press against the shaft 12, forming a tight seal between the seal body 17 and the shaft 12. Alternatively, the seal body 17 may press against the inside race 13, forming a tight seal between the seal body 17 and the inside race 13. The seal body 17 functions to prevent lubricant leakage from the bearing 11.

The seal body 17 may have a contact surface 19 defined as the surface which contacts the adjacent moving surface of the shaft 12 to form a tight seal. The seal body 17 may be composed of a polymeric material or other suitable substance and should be a dielectric or an electrical insulator. The material of the seal body 17 is softer than the shaft 12 so that friction preferentially wears the seal body 17 rather than the shaft 12. The contact surface 19 of the seal body 17 gradually wears away due to friction between the outer surface of the shaft 12 and the seal body 17.

Figure 2:
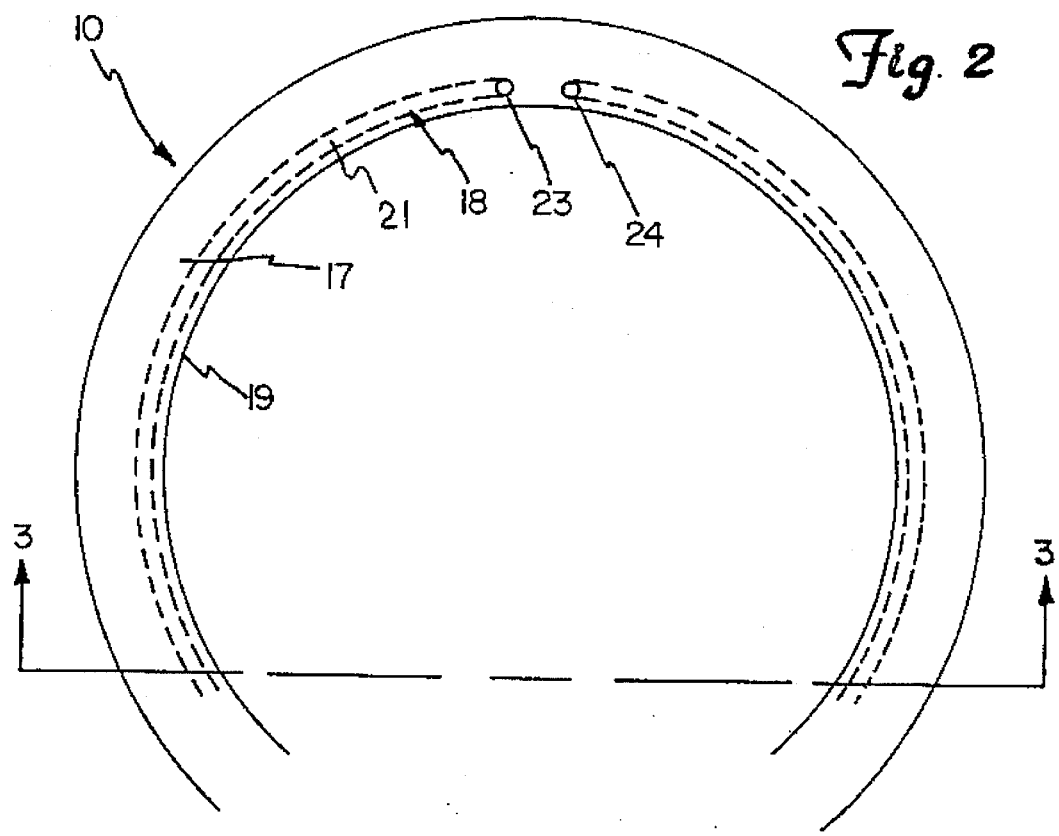
FIG. 2 is an enlarged fragmentary side view of the seal of the present invention.

FIG. 2 shows a conductor 18 embedded within the seal body 17 at a specified depth. Alternatively, the conductor 18 may be attached to the outside of the seal body 17 at a specified depth. The seal body 17 may be initially formed such that the contact surface 19 has an interference fit with the outer surface of the shaft 12. The portion of the seal body 17 forming the interference fit may be referred to as the wear lip. The specified depth at which the conductor 18 is embedded within or attached to the seal body 17 may be slightly less than the depth of seal wear which will cause the seal 10 to leak. For instance, the specified depth may be at 90% of the initial depth of wear lip. In this case, if leakage of the seal 10 occurs when the wear lip is completely worn away, electrical continuity through the conductor would indicate when the seal is 90% worn toward leakage. Of course, the desired specified depth of the conductor 18 is dependant upon the particular application, and this example is not intended to limit the scope of the invention.

The conductor 18 may be composed of any material which conducts electricity, such as a metal wire or a carbon filament. Preferably, the conductor 18 may be formed of an electrically conductive polymer such as a conductive epoxy known as a polymer thick film. The polymer thick film may contain a polymer base material and a fill material to provide electrical conductivity. The fill material in the polymer thick film may be any material which will allow the polymer thick film to conduct electricity upon curing, such as particles of iron, aluminum, copper, silver, gold, or carbon. The polymer thick film material may exist in a liquid or paste form prior to curing into a solid. Alternatively, the polymer thick film material may exist in a solid solder form which converts to a liquid form upon heating. Polymer thick film materials are currently used in the surface mount of miniaturized electronic products such as microelectronic printed circuit boards.

The liquid or paste state of the polymer thick film provides ease of workability and application to the polymer material of the seal body 17, as well as reliable adherence to the seal body 17. The polymer thick film may be applied to the seal body 17 by brushing or by drawing a bead of polymer thick film out of a syringe onto the surface of the seal body 17. Alternatively, the polymer thick film may be applied to the seal body 17 through screen printing, masking or stenciling.

The cured polymer thick film may take on similar physical properties to the polymeric material of the seal body, including that the thick film application is softer than the shaft 12 so that friction preferentially wears the thick film application rather than the shaft 12. Accordingly, the polymer thick film may itself form part or all of the contact surface 19 at various depths of seal wear.

An example of a polymer thick film material is PTEA400 manufactured by Pinnacle Technologies, Inc. of Mattawana, Pa. The PTEA400 material is an epoxy adhesive base filled with gold particles. Upon curing, the PTEA400 material as a volume resistivity of 0.002 ohm-cm. The consistency of the PTEA400 material before curing is a smooth thixotropic paste. Curing of the PTEA400 takes place in approximately two hours at 150° C. or other similar conditions.

While the conductor 18 may be attached to the outside of the seal body 17 and openly exposed, it is preferable to insulate the conductor 18 by the seal body 17 or by an insulation layer of a dielectric or electrically nonconductive material. The insulation layer helps to prevent accidental or premature shorting of the conductor 18 with the shaft 12 or other exposed surfaces. The insulation layer may be provided by a material which is applied in a liquid or paste form, which dries or cures into a solid material. Using an insulating material which is applied in a liquid form has advantages similar to those discussed above for polymer thick films. The insulation layer may have similar physical properties to the polymeric material of the seal body, and the insulation layer may itself form part or all of the contact surface 19 at various depths of seal wear. An example of a material suitable for use as the insulation layer is LIQUID ELECTRICAL TAPE manufactured by Starbright of Fort Lauderdale, Fla..

Figure 3:
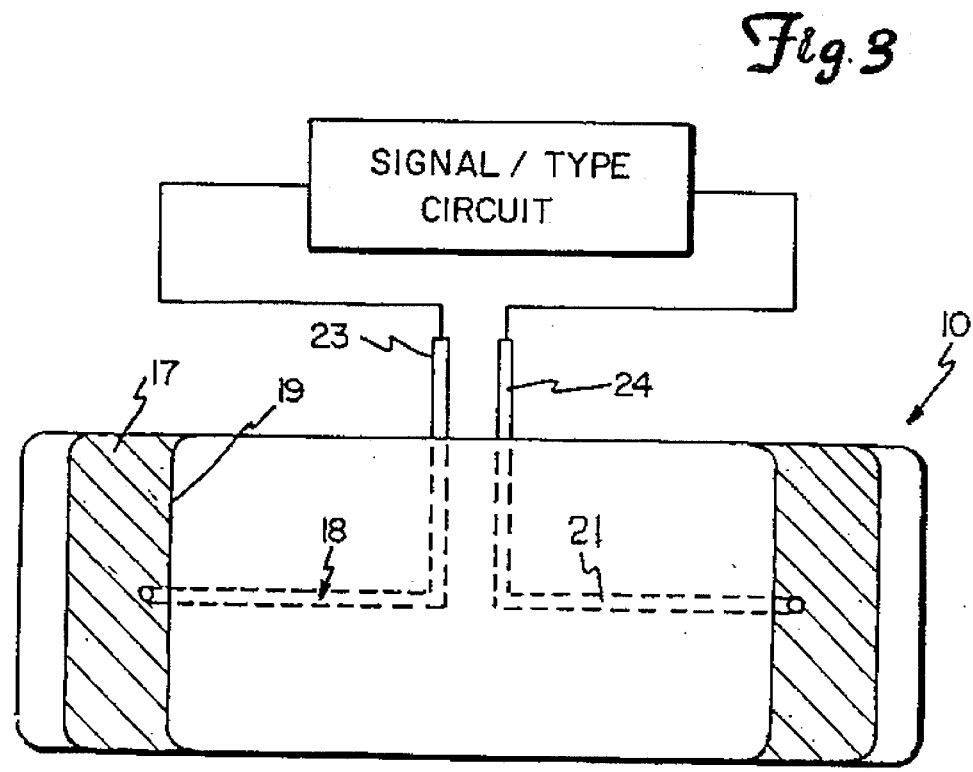
FIG. 3 is a cross-sectional view taken along the line 3—3 in FIG. 2.

As shown in FIG. 3, the conductor 18 may have a contact portion 21 together with a first post 23 and a second post 24. The first post 23 and the second post 24 may extend outside the seal body 17 for connection to an exterior signal-type electrical circuit, shown schematically. The electrical circuit may signal to an operator that the seal 10 requires replacement either based on the absence of electrical continuity through the contact portion 21 between the first post 23 and the second post 24, or based on the existence of electrical continuity between the conductor 18 and the shaft 12.

Figure 4:
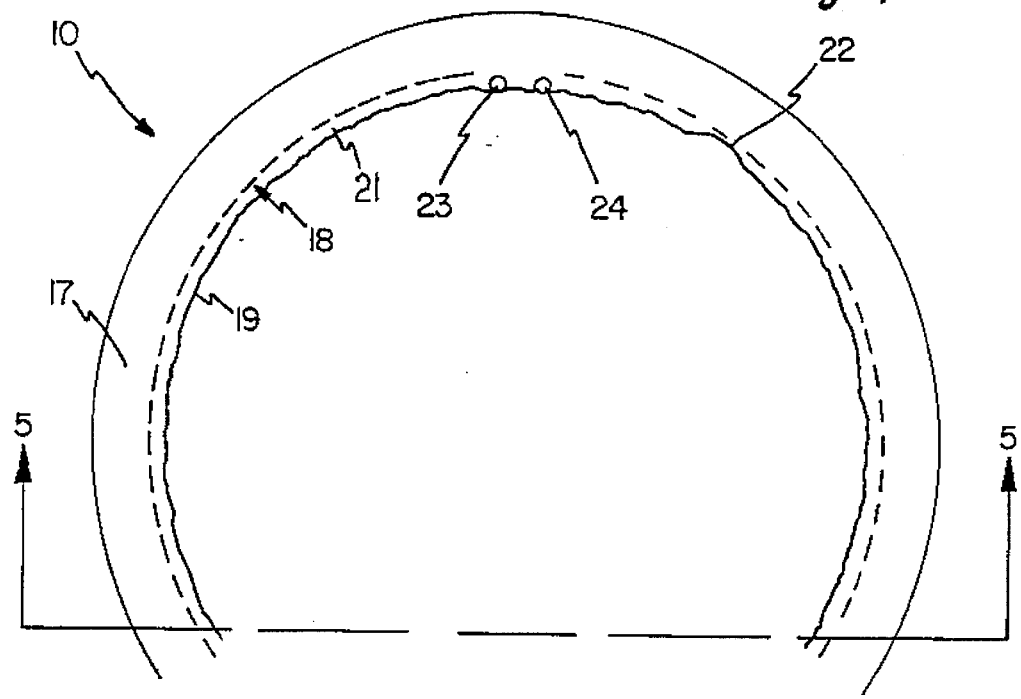
FIG. 4 is an enlarged fragmentary side view of the seal of the present invention, after the seal body has worn to the specified depth.
Figure 5:
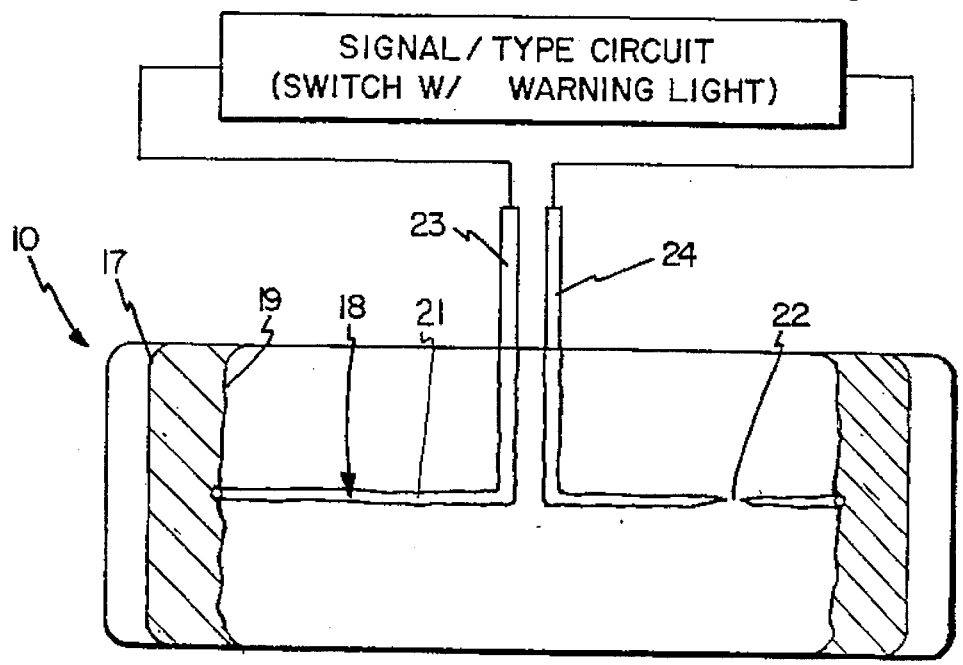
FIG. 5 is a cross-sectional view taken along the line 5—5 in FIG. 4, after the seal body has worn to the specified depth.

FIGS. 4 and 5 show the seal 10 immediately after friction between the shaft 12 and the seal body 17 has worn the seal body 17 to the specified depth. At this point, the contact portion 21 of the conductor 18 has worn completely through at point 22, so that there no longer is electrical continuity between the first post 23 and the second post 24. A suitable mechanism may be provided in the signal-type circuit to indicate lack of electrical continuity, such as an electromagnetically driven switch which actuates a warning light. Alternatively, a suitable mechanism such as an ohmmeter may monitor electrical resistance between the first post 23 and the second post 24, with an increase 25 in resistance as the conductor 18 begins to wear at point 22 indicating the need for seal replacement.

Figure 6:
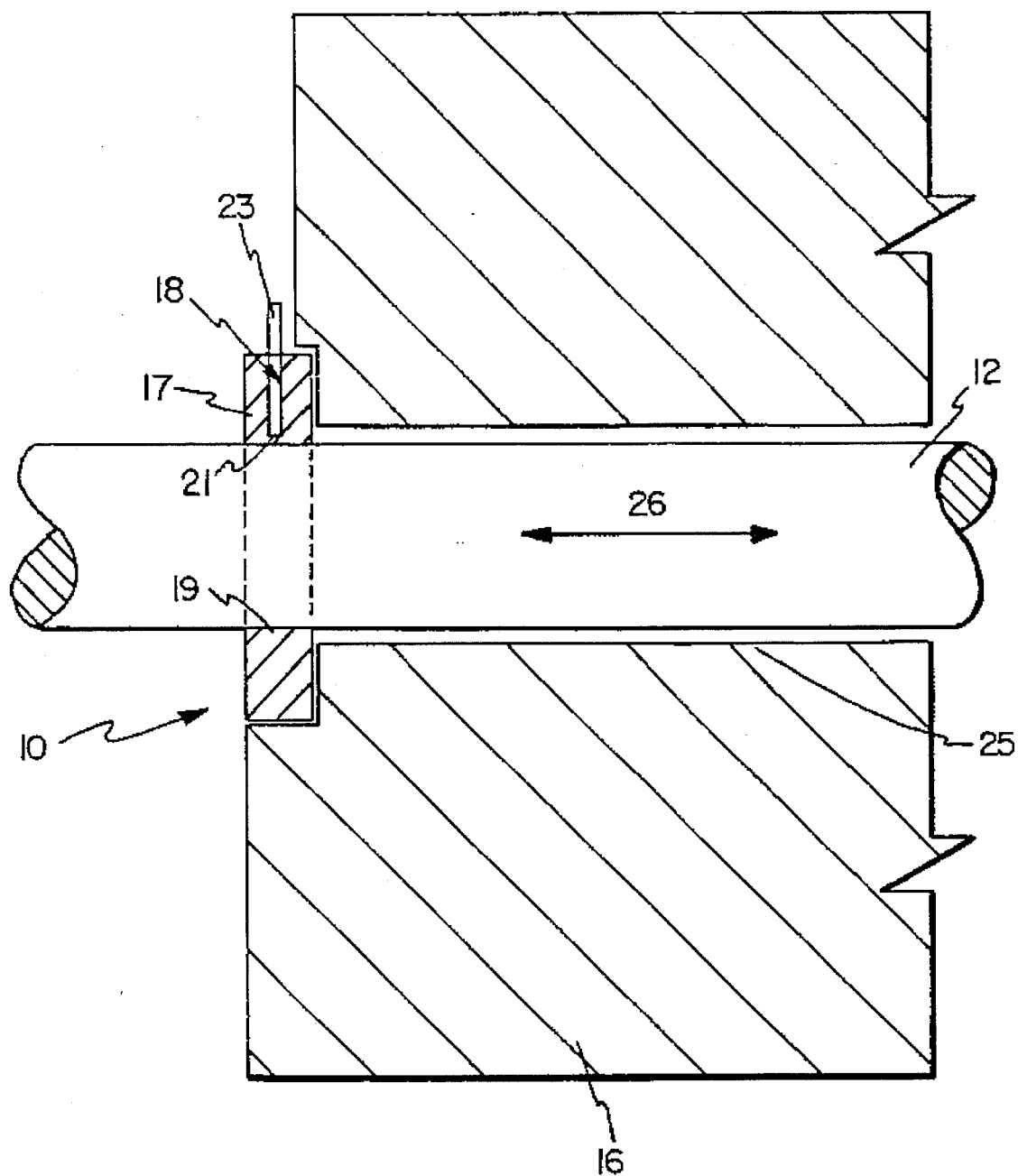
FIG. 6 shows a cross-sectional side view of an alternate embodiment of the seal in place, adjacent a bearing and around a shaft.
Figure 7:
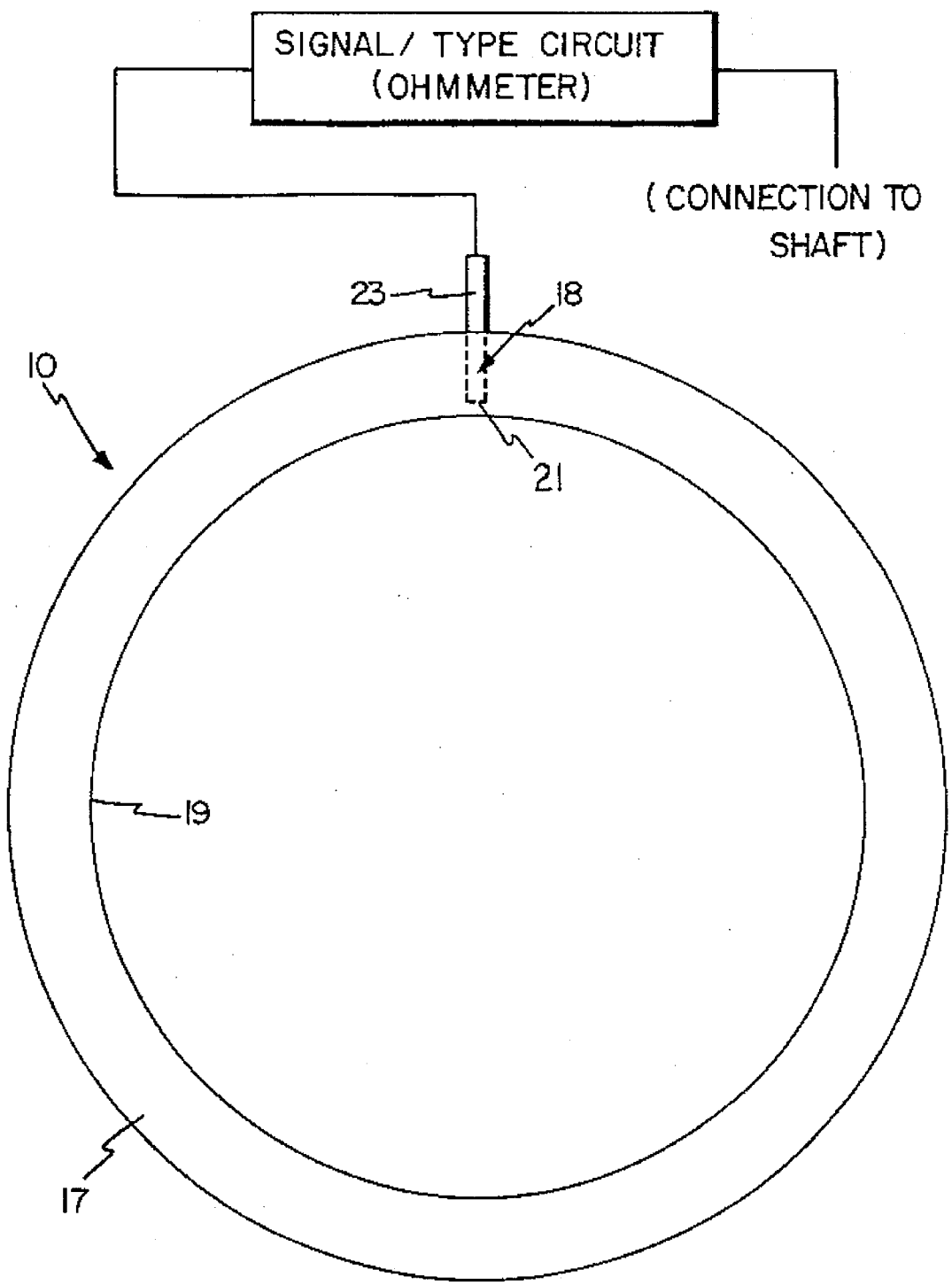
FIG. 7 is an enlarged fragmentary side view of the alternate embodiment of the seal shown in FIG. 6.

FIGS. 6 and 7 show an alternate embodiment of the seal 10 wherein the conductor 18 has only contact portion 21 and a first post 23. The contact portion 21 of the conductor 18 does not encircle the shaft 12, but merely ends at the specified depth. When wear of the seal body 17 reaches the specified depth, the contact portion 21 contacts the shaft 12, creating electrical continuity between the conductor 18 and the shaft 12. As shown in this alternate embodiment, the shaft 12 may reciprocate as indicated by arrow 26. The shaft 12 may alternatively oscillate, changing direction of rotation, or otherwise move with respect to the seal 10. The shaft 12 may ride on a bearing surface 25 of the housing 16. A suitable meter may be provided in the signal-type circuit to read the presence of electrical continuity, such as an ohmmeter.

Operation of the Invention

Although operation of the present invention is apparent from the preceding description, it will be detailed hereinafter to provide a more complete understanding of the present invention. As the contact surface 19 of the seal body 17 wears away, the conductor 18 gradually moves closer and closer to the shaft 12. As seal wear continues, the contact portion 21 of the conductor 18 contacts the shaft 12 and wears away along with the seal body 17. The conductor 18 is embedded or attached at a specified depth such that the conductor 18 can wear entirely through before the seal 10 begins to leak. When the contact portion 21 of the conductor 18 is worn entirely through, as shown in FIGS. 4 and 5 at point 22, there is no longer electrical continuity between the first post 23 and the second post 24. Because further wear of the seal body 17 may cause the seal 10 to leak, the absence of electrical continuity between the first post 23 and the second post 24 may indicate to an operator that the seal body 17 has worn to a point such that the seal 10 requires replacement.

Alternatively, the conductor 18 may be placed at a specified depth such that contact between the conductor 18 and the moving surface of the shaft 12 occurs at the time when the seal body 17 has worn such that the seal 10 requires replacement. In this case, when the seal body 17 wears to a specified depth, the existence of electrical continuity between the conductor 18 and the shaft 12 indicates to an operator that the seal 10 should be replaced.

Although the present invention has been described with reference to a preferred embodiment, workers skilled in the art will recognize that changes may be made in form and detail without departing from the spirit and scope of the invention.

What is claimed is:

1. A seal for preventing leakage of fluid from between a first member and a second member, the second member moving with respect to the first member, said seal comprising:

sealing means for engaged contact with the first member and the second member so as to prevent leakage of fluid between the first member and the sealing means and between the second member and the sealing means, said sealing means being softer than the second member such that friction between the sealing means and the second member wears the sealing means faster than the second member, said sealing means being adapted to retain a tight seal against the second member as long as said sealing means has not worn beyond a specified depth; and a conductor for placement about the second member, said conductor comprising an electrically conductive polymer thick film; said conductor being attached to the sealing means at said specified depth so as to contact the second member when the sealing means has worn to said specified depth, such that the existence of electrical continuity between the conductor and the second member indicates that the seal requires replacement;

wherein the conductor is positionally associated to the sealing means such that wear of the sealing means corresponds with movement of the conductor toward the second member; and wherein electrical continuity indicates whether the seal requires replacement.

2. A seal for preventing leakage of a fluid from between a first member and a second member, the second member remaining a constant distance from and moving with respect to the first member, said seal comprising:

sealing means for engaged contact with the first member and the second member so as to prevent leakage of fluid between the first member and the sealing means and between the second member and the sealing means, said sealing means being softer than the second member such that friction between the sealing means and the second member wears the sealing means faster than the second member, said sealing means being adapted to retain a tight seal against the second member as long as said sealing means has not worn beyond a specified depth; and a conductor placed such that said conductor substantially circumscribes said second member before said seal is worn, said conductor being adapted to conduct electricity: said conductor being attached to the sealing means at said specified depth so as to contact the second member when the sealing means has worn to said specified depth, such that the existence of electrical continuity between the conductor and the second member indicates that the seal requires replacement; and wherein electrical continuity indicates whether the seal requires replacement.

3. The seal of claim 2 wherein the specified depth is 90% of the wear allowable before the seal begins to leak.

4. The seal of claim 2 wherein the sealing means is for preventing the leakage of lubricant between the first member and the second member.

5. The seal of claim 2:

wherein the sealing means is composed of a dielectric polymeric material;

wherein the conductor comprises an electrically conductive polymer thick film applied in a liquid form to the sealing means at said specified depth of the sealing means;

wherein the sealing means comprises an insulation layer applied to the sealing means in a liquid form, the insulation layer electrically insulating the conductor from the second member, the insulation layer being adapted to retain a tight seal against the second member as long as said insulation layer has not worn entirely through; and wherein the conductor will contact the second member when the insulating means has worn entirely through, such that the existence of electrical continuity between the conductor and the second member indicates that the seal requires replacement.

6. The seal of claim 2 wherein the conductor is embedded in the sealing means for positional association of the conductor to the sealing means.

7. The seal of claim 2 wherein the conductor comprises:

a contact portion; and a post extending from the contact portion;

wherein the post is for connection to a circuit to determine electrical continuity between the conductor and the second member.

8. The seal of claim 7 wherein the conductor is partially embedded in the sealing means for positional association of the conductor to the sealing means, wherein the post extends outside the sealing means.

9. The seal of claim 2 wherein the conductor comprises a thin metal wire.

10. The seal of claim 2 wherein the conductor comprises a thin carbon filament.

11. The seal of claim 2 wherein the conductor comprises an electrically conductive polymer thick film.

12. The seal of claim 2 wherein the conductor will have worn to said specified depth, such that the absence of electrical continuity through the conductor indicates that the seal requires replacement.

13. The seal of claim 2 wherein the conductor is a type applied to the sealing means in a liquid form.

14. The seal of claim 2 wherein the sealing means comprises a contact surface which contacts the second member and a wear lip adjacent the contact surface, wherein the conductor is attached to the wear lip of the sealing means.

15. The seal of claim 2 wherein the sealing means includes a nonconductive insulation layer which electrically insulates the conductor from the second member.

16. The seal of claim 15 wherein the insulation layer is a type applied to the sealing means in a liquid form.

17. The seal of claim 15 wherein the insulation layer is for engaged contact with the second member to prevent leakage of fluid between the second member and the sealing means, the insulation layer being softer than the second member such that friction between the insulation layer and the second member wears the insulation layer faster than the second member, the insulation layer being adapted to retain a tight seal against the second member as long as said insulation layer has not worn entirely through.

18. The seal of claim 2 wherein the sealing means is composed of a dielectric polymeric material.

19. The seal of claim 2 wherein the second member rotates with respect to the first member.

20. The seal of claim 2 wherein the second member reciprocates with respect to the first member.

21. A method of determining wear of a seal having a sealing means which prevents leakage of a fluid from between a first member and a second member, the second member remaining a constant distance from and moving with respect to the first member, said method comprising the steps of:

placing a conductor in positional association to the sealing means such that said conductor substantially circumscribes said second member before the seal is worn, and such that the conductor will contact the second member when the sealing means has worn to a specified depth; and determining electrical continuity;

wherein electrical continuity indicates whether the seal requires replacement.

* * * * *